(12) United States Patent
Hsu

(10) Patent No.: US 6,665,979 B1
(45) Date of Patent: Dec. 23, 2003

(54) WATER CONTAINER WITH FLOATING ELECTROCUTION DEVICE EQUIPPED TRAP FOR KILLING GRAVID MOSQUITOES

(76) Inventor: Gene C. Hsu, 1511 Palm Ave. #E, San Gabriel, CA (US) 91776

(*) Notice: Subject to any disclaimer, the term of this patent is extended or adjusted under 35 U.S.C. 154(b) by 0 days.

(21) Appl. No.: 10/367,433

(22) Filed: Feb. 11, 2003

(51) Int. Cl.[7] .............................. A01M 1/22; A01M 1/02
(52) U.S. Cl. ........................................ 43/112; 43/107
(58) Field of Search ......................... 43/112, 107, 132.1

(56) References Cited

U.S. PATENT DOCUMENTS

| | | | |
|---|---|---|---|
| 1,065,782 A | * 6/1913 | Cronk | 43/112 |
| 1,108,309 A | * 8/1914 | Allen et al. | 43/112 |
| 1,807,076 A | * 5/1931 | Sweet | 43/107 |
| 1,823,892 A | * 9/1931 | Galbraith | 43/112 |
| 1,996,293 A | * 4/1935 | House | 43/107 |
| 2,012,384 A | * 8/1935 | Gatti | 43/112 |
| 2,038,495 A | * 4/1936 | Keller | 43/112 |
| 2,307,163 A | * 1/1943 | Shea | 43/112 |
| 3,997,999 A | * 12/1976 | Evans | 43/107 |
| 4,037,351 A | * 7/1977 | Springer | 43/112 |
| 4,328,636 A | * 5/1982 | Johnson | 43/107 |
| 4,914,854 A | * 4/1990 | Zhou et al. | 43/112 |
| 5,123,201 A | * 6/1992 | Reiter | 43/107 |
| 5,241,779 A | * 9/1993 | Lee | 43/112 |
| 5,799,436 A | * 9/1998 | Nolen et al. | 43/112 |
| 5,896,697 A | * 4/1999 | Kang | 43/107 |
| 5,967,084 A | * 10/1999 | Klemantaski | 43/112 |
| 5,983,557 A | * 11/1999 | Perich et al. | 43/107 |
| 6,023,884 A | * 2/2000 | Yanohara | 43/132.1 |
| 6,050,025 A | * 4/2000 | Wilbanks | 43/112 |
| 6,055,766 A | * 5/2000 | Nolen et al. | 43/112 |
| 6,209,256 B1 | * 4/2001 | Brittin et al. | 43/107 |
| 6,305,122 B1 | * 10/2001 | Iwao et al. | 43/112 |
| 6,338,220 B1 | * 1/2002 | Dicks | 43/132.1 |
| 6,467,215 B1 | * 10/2002 | Nelson et al. | 43/107 |
| 6,516,559 B1 | * 2/2003 | Simchoni et al. | 43/107 |
| 6,530,172 B2 | * 3/2003 | Lenz | 43/112 |
| 6,530,173 B2 | * 3/2003 | Meade et al. | 43/112 |
| 6,568,124 B1 | * 5/2003 | Wilbanks | 43/112 |
| 2003/0061757 A1 | * 4/2003 | Askin | 43/112 |

FOREIGN PATENT DOCUMENTS

| | | | | |
|---|---|---|---|---|
| DE | 2749419 B1 | * 3/1979 | | 43/112 |
| EP | 547828 B1 | * 6/1993 | | |
| FR | 987868 B1 | * 8/1951 | | 43/112 |
| JP | 2000-139318 | * 5/2000 | | |
| JP | 2000-154589 B1 | * 6/2000 | | |
| JP | 2000-189030 B1 | * 7/2000 | | |
| JP | 2002-125563 B1 | * 5/2002 | | |
| WO | WO-02/098218 B1 | * 12/2002 | | |

* cited by examiner

Primary Examiner—Darren W. Ark

(57) ABSTRACT

A trap for killing gravid mosquitoes which includes a vessel containing water, an electrocution device with a rough inner surfaced frame supported by a floating ring floating above the water, and a walled structure with an opening on the upper ½ portion of one side of the walls. The vessel with the floating electrocution device is arranged inside of the walled structure to form a tree hole-like trap. The present invention provides an apparatus to kill the gravid mosquitoes, also a method to control the mosquitoes by providing an environment to accommodate the mosquitoes' favored breeding behavior needs and uses water as an attractant to lure the mosquitoes into attempting to land or breed on the rough surface of the electrocution device and be killed. This method can kill the gravid mosquitoes before they lay eggs without any use of chemical poisons.

15 Claims, 4 Drawing Sheets

WATER CONTAINER WITH FLOATING ELECTROCUTION DEVICE EQUIPPED TRAP FOR KILLING GRAVID MOSQUITOES

BACKGROUND OF THE INVENTION

The present invention relates to a water container with a floating electrocution device equipped trap for killing gravid mosquitoes. The present invention also relates to a controlling method for mosquito populations without any use of chemical poisons.

During summer season, governments ask people to drain the water in tires and containers, to deprive mosquitoes of a place to breed. This method does not work well because the gravid mosquitoes are still alive to breed elsewhere. However, it shows that water in containers form a suitable environment for gravid mosquitoes to breed. If we can take advantage of the mosquitoes' natural breeding behavior, mosquito control would be much more effective and more efficient. Various traps have been developed based on this idea.

U.S. Pat. No. 5,123,201 describes a sensor-triggered suction trap for collecting live gravid mosquitoes. When a fan is triggered by a mosquito interrupted an infrared beam, it blows the mosquito into a container for collection. Such a trap does not kill mosquitoes and is relatively complicated and not economically sufficient.

U.S. Pat. No. 5,983,557 describes an egg laying structure soaked in insecticide can kill the female mosquitoes which come in contact with the surface. Such a trap uses chemical poisons as a lethal weapon towards mosquito control. These chemical poisons must be dealt with after application; eventually, these poisons will go into the ground and be absorbed into the soil or poured into the drain system and will pollute the water. Also after a period of time, chemical poisons will become less effective due to the resistant strains and cross-resistance of mosquitoes. It is favorable to be able to avoid such environmental influences completely, and it has turned out to be possible to use electrical killing devices instead.

Some electrical traps use light to attract insects are misused for mosquito control and are not effective, because mosquitoes are not attracted by light; moreover, it tends to turn away from the light source. Therefore, such traps may work for some of the insects but are not efficient for mosquito control.

An effective trapping apparatus and method which uses an electrical killing device combined with an attractive environment to accommodate mosquito's natural breeding behavior is desirable and needed for mosquito control and is provided by the present invention.

BRIEF SUMMARY OF THE INVENTION

It is an objective of the present invention to provide an effective apparatus for controlling mosquito especially gravid mosquitoes.

It is an objective of the present invention to provide a method of mosquito control by setting a floating electrocution device above the water in a vessel located in a walled structure which forms a tree hole-like trap to attract the mosquitoes to land or breed on the rough surface of the electrocution device and be killed by a high voltage shock provided by an electric power source.

It is an objective of the present invention to provide an effective apparatus and method for controlling mosquitoes both indoors and outdoors.

It is an objective of the present invention to provide an environmentally safe apparatus and method for mosquito control without any use of chemical poisons.

It is an objective of the present invention to provide an apparatus and method is simple and economically efficient.

DETAILED DESCRIPTION OF THE INVENTION

Figure 1:
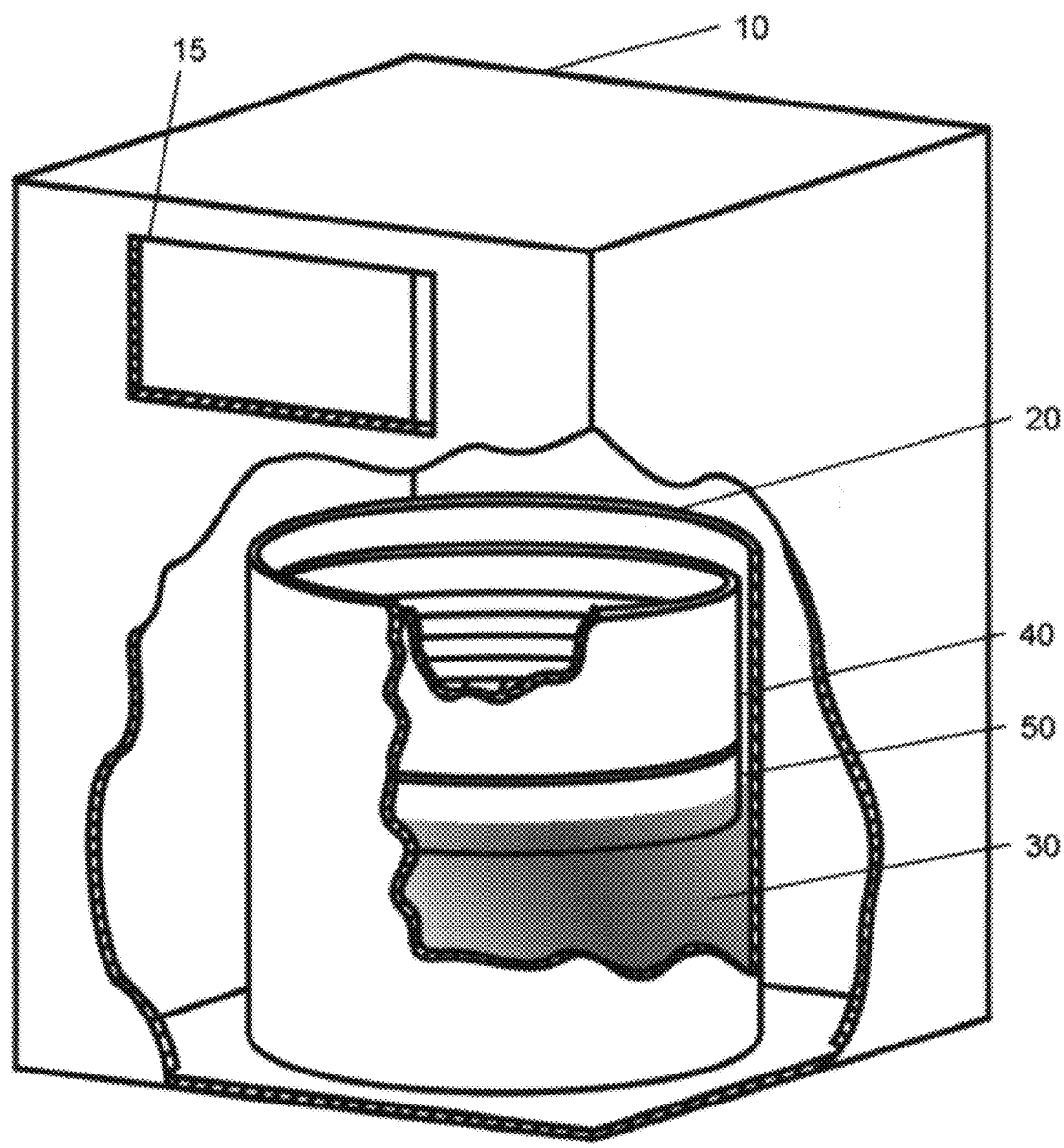
FIG. 1 is a perspective front view of the water container with a floating electrocution device equipped trap for killing gravid mosquitoes.

Referring to FIG. 1, the trap for killing gravid mosquitoes in accordance with the present invention comprises a walled structure 10, an opening 15 disposed on the upper ½ portion of one side of the walls, a vessel 20, a certain volume of water 30 in the vessel, an electrocution device set in a cylindrical frame 40 above the floating ring 50 to be arranged on the water in the vessel.

Figure 2:
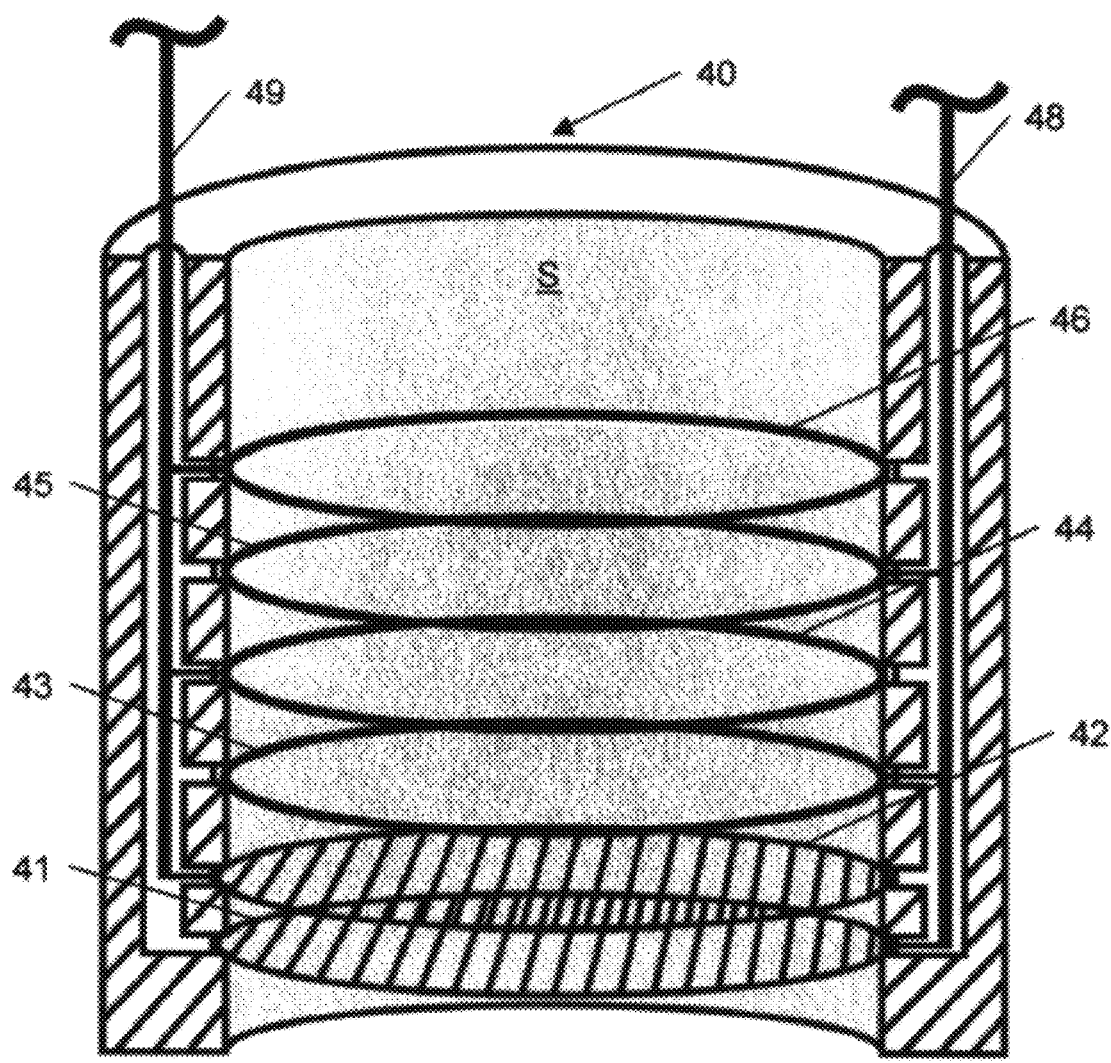
FIG. 2 is a cutaway featuring a sectional view of the arrangement of the electrode grids and the conductive strips on the cylindrical frame.

FIG. 2 is a cutaway featuring a sectional view of the arrangement of the electrode grids and the conductive strips on the cylindrical frame. The first layer of the electrode grid 41 is positioned horizontally close to the bottom of the frame. The second layer of the electrode grid 42 is arranged 3 mm above the first layer grid on the frame. The conductive strips 43, 44, 45, and 46 are set in grooves encircling the inner upright cylindrical wall of the frame, and are 5 mm apart from each other. The distance between the circle of electrode grid 42 and the conductive strip 43 is also 5 mm. There are two wires, 48 and 49, are set in the body of the sidewall of the frame. The distance from the top of the frame to the conductive strip 46 is no more than 2 cm. The frame body of the electrocution device is made from non-conducting, light weighted materials preferably plastic. The inner surface S of the upright cylindrical wall of the frame is rough and is black in color. All of the electrode grids and the conductive strips are also black to provide a preferable resting and breeding area for the gravid mosquitoes.

Figure 3:
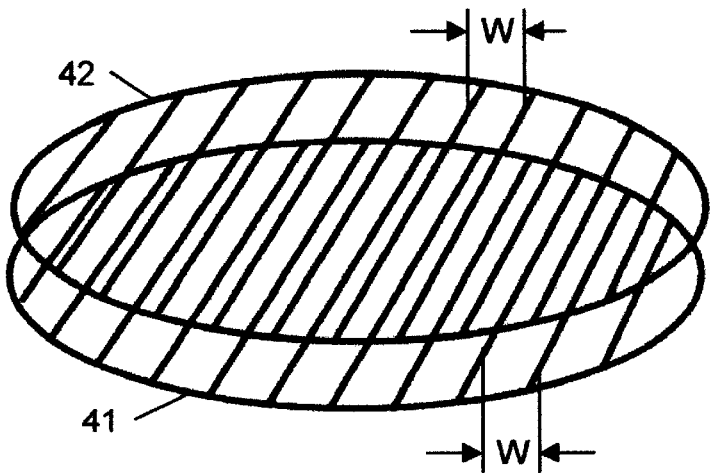
FIG. 3 shows the two layers of the electrode grid.

As shown in FIG. 3, the two layers of the electrode grid are identical to each other and the space between each parallel electrode W is 7 mm. The electrodes on the first layer and the electrodes on the second layer are aligned with each other.

Figure 4:
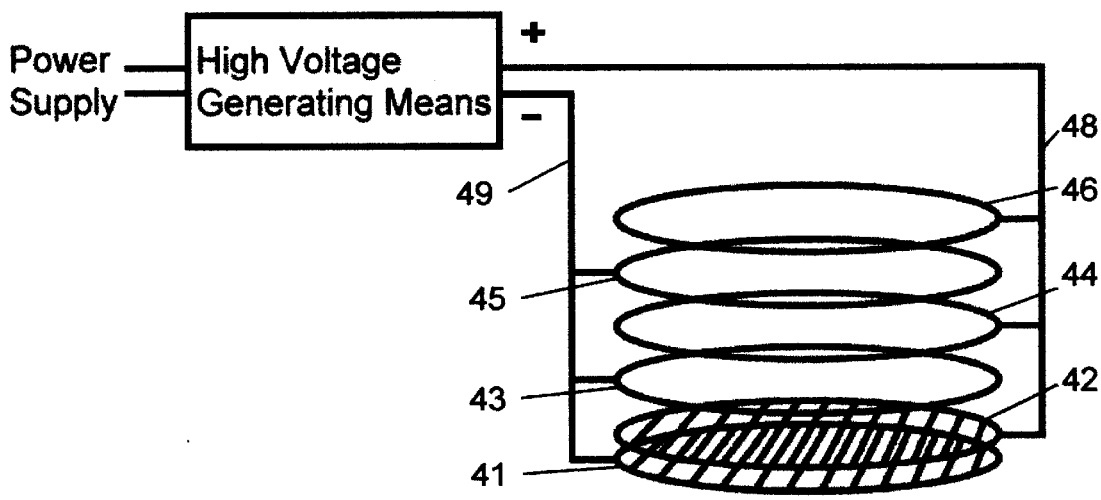
FIG. 4 is a diagram of the electrical connections of the two wires to the conductive strips and the electrode grids.

FIG. 4 is a diagram of the electrical connections of the two wires to the conductive strips and the electrode grids. The wire 49 is connected to the electrode grid 41 and the conductive strips 43 and 45; and the wire 48 is connected to the electrode grid 42 and the conductive strips 44 and 46. These wires receive high voltage power of 1000 volts or more from a high voltage generating circuit composed of a vibrator, a transformer, and a plurality of voltage doublers connected in a conventional configuration which is well known and is not shown and not described in detail. The power supply to the high voltage generating circuit can be a 12 V battery (not shown) for outdoor use or an AC power indoor outlet through an AC/DC converter (not shown) for indoor use.

Figure 5:
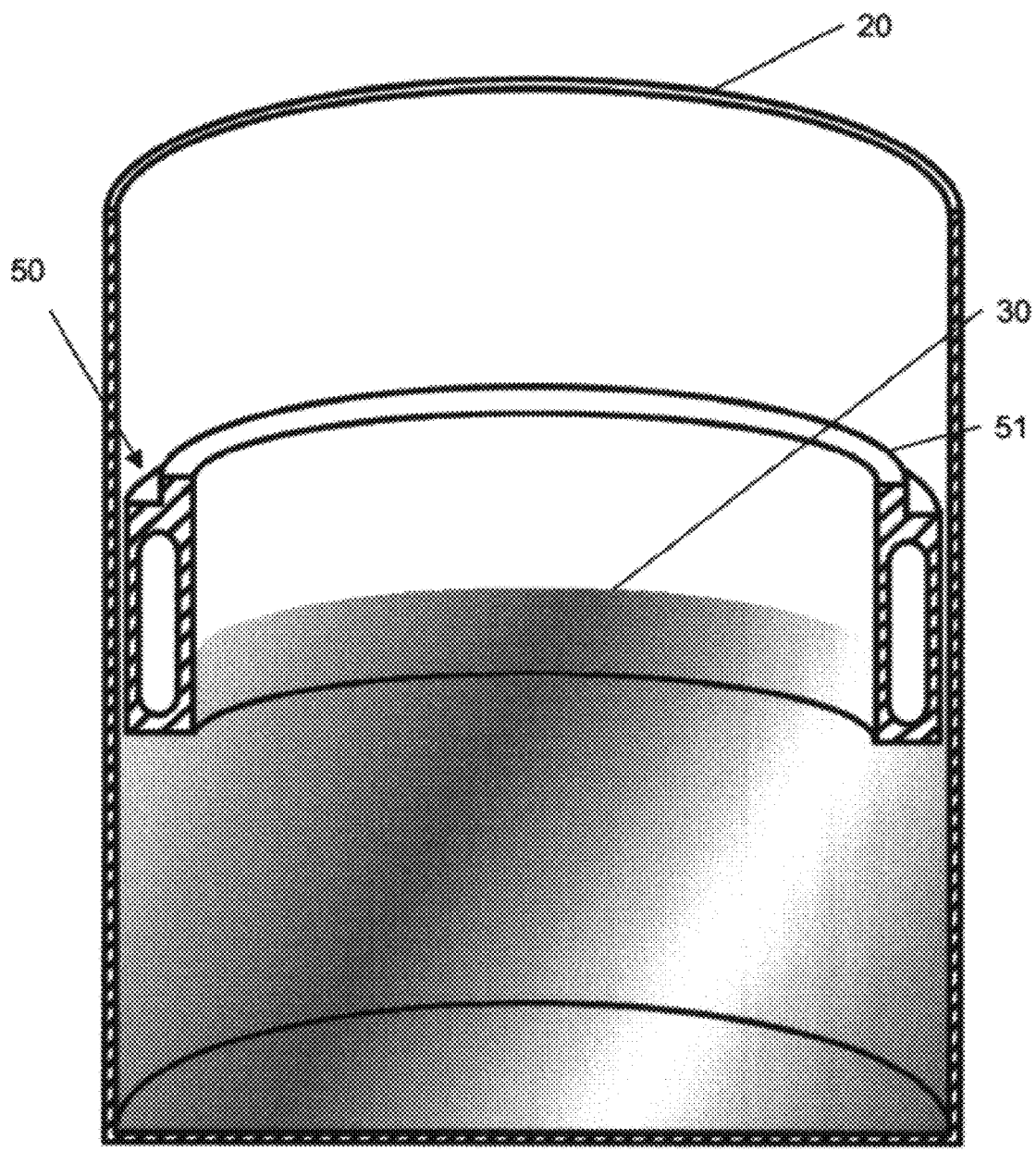
FIG. 5 is a perspective view showing the floating ring floating on the water in the vessel.

The floating ring 50, as shown in FIG. 5, is a circled hollow pipe made from plastic so that it can float on the water and can support the electrocution device above the water. The external diameter of the floating ring is the same as the diameter of the frame and the top portion of the floating ring has an inner flange 51, which has a smaller diameter than the caliber of the frame so these two parts can clutch together. The vessel 20 is in a cylindrical shape with an opening on the top to allow water to be added or emptied and for the floating ring and the electrocution device to be put into or removed from the vessel as needed. The caliber of the vessel is no more than 2 mm greater than the diameter of the frame to allow it to float freely but not to allow the mosquitoes to sneak into the space and move to the water surface directly. All the surfaces of the vessel are smooth so as not to provide a preferable surface for the mosquitoes to rest or breed on. The color of the vessel is preferably black. The vessel is filled with water 30, preferably to be approximately ½ to ⅔ of the vessel's capacity in volume. The water is preferably from a natural source such as from rain, ponds, or lakes but not directly from the faucet. The floating ring is put on the water and then the electrocution device is put on the floating ring in the vessel. Afterwards, the device is connected to the power supply.

Referring to FIG. 1, the walled structure 10 has an opening on the upper portion of one side of the walls. The size of the chamber defined by the walls is big enough to hold the vessel and a high voltage generating means (not shown) and enough room above the vessel for the mosquitoes to hover. The height of the walled structure ideally is 8 to 10 cm taller than the height of the vessel. The walled structure can be colored in black, brown or green, and can be made from plastic or water resistant paper.

Referring to FIG. 1, the present invention is a trap and a method for killing gravid mosquitoes by forming a tree hole-like opening environment to attract gravid mosquitoes that are searching for places to breed to enter the walled structure. The mosquitoes will hover above the vessel in the walled structure and seek a preferable surface to land or breed on. Because the surface of the frame is rough and close to the water which is a preferable landing and breeding place for them, so the mosquitoes will attempt to land on the wall of the frame and move down towards the water and then will be killed by touching the consecutive conductive strips. Some of the thirsty mosquitoes will be trapped by attempting to fly between the spaces in the horizontal electrodes to reach the water below and will be pulled to touch the both layers of the grid by the electrically magnetic field and will be killed, too.

While the present invention describing both the apparatus and the method has been emphasized in terms of a water container with a floating electrocution device for killing gravid mosquitoes, the principles contained therein are applicable to the control of some other flying insects.

Although the invention has been described in detail and with reference to the preferred embodiments thereof, further improvements will be apparent to persons skilled in the art. Various changes and modifications can be made to the claimed invention without departing from the scope of the invention.

What I claim as my invention is:

1. A trap for killing gravid mosquitoes comprising:
    a walled structure with walls defining an inner space and having an opening disposed on an upper-half portion on one of the walls;
    a vessel with a sidewall containing water which is no less than ½ in volume of a total capacity of the vessel;
    a floating electrocution device having a cylindrical frame with a rough inner surface supported by a floating ring floating on the water in said vessel, said cylindrical frame which has a wall and two horizontally positioned electrode grids and sets of conductive strips being arranged on the wall above the horizontal grids;
    a high voltage generating means to provide enough high voltage to the electrode grids and the conductive strips of said floating electrocution device to kill said mosquitoes; and
    a hovering space defined by the frame of the floating electrocution device, the sidewall of the vessel, and the walls of said walled structure, for said mosquitoes to hover above the electrocution device and wherein said mosquitoes will rest or breed on the rough surface of the frame and will get killed by a high a voltage shock.

2. A trap for killing gravid mosquitoes as in claim 1, wherein said walled structure comprises a chamber defined by the walls to contain said vessel and to provide said hovering space.

3. A trap for killing gravid mosquitoes as in claim 1, wherein said opening disposed on the upper-half portion of said one of the walls is for mosquitoes to enter said hovering space.

4. A trap for killing gravid mosquitoes as in claim 1, wherein said walled structure has a height at least 8 cm taller than a height of said vessel.

5. A trap for killing gravid mosquitoes as in claim 1, wherein said vessel is in a cylindrical shape and has a caliber no more than 2 mm greater than a diameter of said frame of the electrocution device.

6. A trap for killing gravid mosquitoes as in claim 1, wherein said vessel is smooth on all surfaces.

7. A trap for killing gravid mosquitoes as in claim 1, wherein said floating electrocution device comprises:
    said a cylindrical frame holding said two horizontally positioned electrode grids close to a bottom of said cylindrical frame and having said conductive strips set in grooves encircling the inner surface of the wall of the frame above the horizontally positioned electrodes grids;
    said a floating ring having an inner flange on its top which is clutched to the bottom of said frame to support the frame to float above the water.

8. A trap for killing gravid mosquitoes as in claim 7, wherein said frame comprising two horizontally positioned electrode grids includes one of said grids being a lower electrode grid arranged no more than 1 cm from the bottom of the frame and the other one of said grids being an upper electrode grid arranged 3 mm above said lower electrode grid to avoid short circuiting.

9. A trap for killing gravid mosquitoes as in claim 7, wherein said two horizontally positioned electrode grids are identical to each other and have their electrodes aligned to each other and the space between electrodes on each layer is 7 mm, so as to lure the mosquitoes into attempting to fly through and to thereby be pulled by the electric field to touch both the positive and negative charged electrode grids and be killed.

10. A trap for killing gravid mosquitoes as in claim 7, wherein said frame comprises said conductive strips independently set in said grooves encircling the inner surface of the wall of the frame 5 mm above the upper electrode grid and the strips are 5 mm apart from each other and the distance from a top of the frame to the nearest conductive strip is no more than 2 cm.

11. A trap for killing gravid mosquitoes as in claim 7, wherein said floating electrocution device receives a high voltage power input from a said high voltage generating means to said electrode grids and said conductive strips, and each of said grids and strips carries a different electric pole with respect to an adjacent grid or strip of said grids and strips.

12. A trap for killing gravid mosquitoes as in claim 7, wherein said frame is made from light weighted insulated materials such as plastic.

13. A trap for killing gravid mosquitoes as in claim 7, wherein said frame inner surface is black.

14. A trap for killing gravid mosquitoes as in claim 7, wherein said floating ring comprises a circular hollow pipe made from plastic.

15. A method for killing gravid mosquitoes, comprising the steps of:

providing water in a vessel with a sidewall;

providing a floating electrocution device with a frame having a rough surface supported by a floating ring to float above said water, the electrocution device also including electrode grids and conductive strips;

arranging said vessel in a walled structure with walls which has an opening on an upper-half portion of one of the walls to form a natural tree hole-like environment;

wherein a hovering space is formed by the frame of the floating electrocution device, the sidewall of the vessel, and the walls of said walled structure for the gravid mosquitoes to hover above the electrocution device;

providing a preferable resting and breeding area for the mosquitoes which is formed by the rough surface of the frame; and providing a high voltage generating means to provide a voltage of sufficient strength to the electrode grids and the conductive strips of the electrocution device to kill said mosquitoes, and wherein once the mosquitoes land on said electrocution device, the mosquitoes will be killed even before they lay eggs without any use of chemical insecticides.

* * * * *